United States Patent [19]

Kite

[11] Patent Number: 4,889,419
[45] Date of Patent: Dec. 26, 1989

[54] CARD FILE MIRROR

[76] Inventor: Dolores N. Kite, 2800 Nielson Way, #705, Santa Monica, Calif. 90405

[21] Appl. No.: 356,791

[22] Filed: May 24, 1989

[51] Int. Cl.⁴ .................................................. G02B 5/08
[52] U.S. Cl. .................................... 350/600; 350/631; 40/380
[58] Field of Search ................ 350/600, 631; 248/473; 40/373, 374, 380, 383, 900

[56] References Cited

U.S. PATENT DOCUMENTS 4,648,189  3/1987  Michel .................................. 40/900

Primary Examiner—Bruce Y. Arnold
Assistant Examiner—J. Patrick Ryan
Attorney, Agent, or Firm—Blakely, Sokoloff, Taylor & Zafman

[57] ABSTRACT

An improved mirror for use with card index files. The mirror comprises a substantially rectangular flat portion which is reflective. Attached to the rectangular portion is an attachment portion for attaching the mirror to a standard card file. This attachment portion takes the form of specially shaped extensions. The extensions define cut out portions which fit over rails in the card file. The cut out portions are small enough to hold the mirror to the card file, yet large enough to permit the mirror to be easily moved while it is in the files. The mirror is manufactured for a flexible plastic so that the mirror may be easily snapped into place by a user.

7 Claims, 2 Drawing Sheets

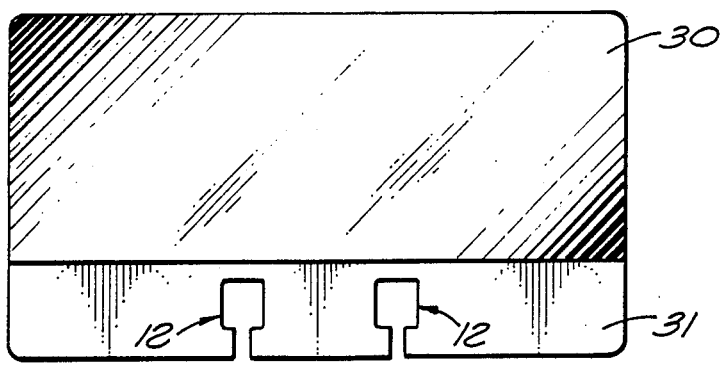 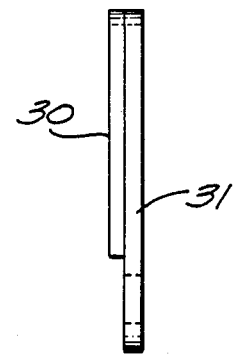
FIG. 4a　　　　　　　　　　FIG. 4b
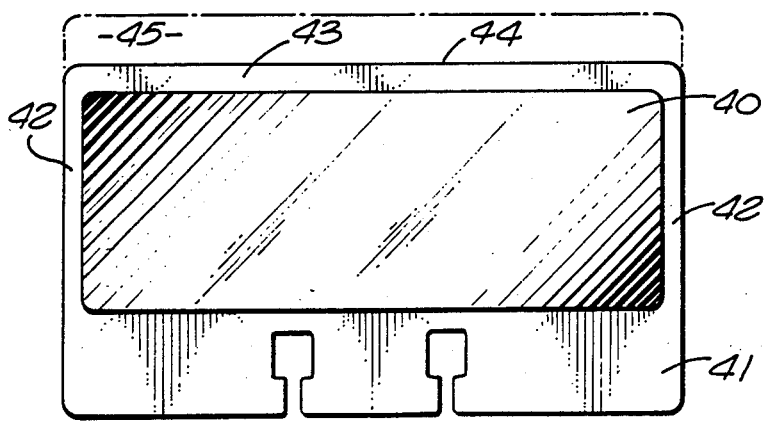 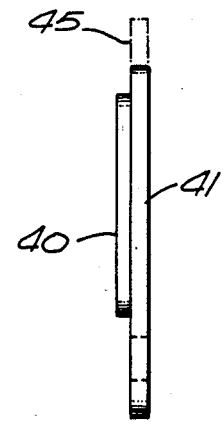
FIG. 5a　　　　　　　　　　FIG. 5b
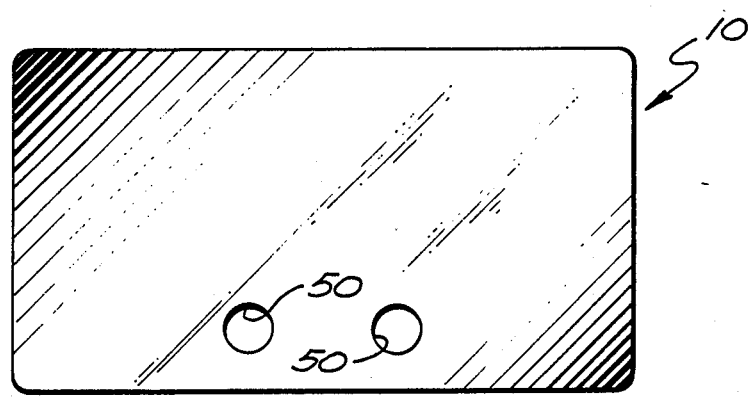
FIG. 6

CARD FILE MIRROR

BACKGROUND

1. FIELD OF THE INVENTION:

The present invention relates to the field of office equipment and more specifically to an improved mirror to be used in conjunction with a card file.

2. ART BACKGROUND:

A common piece of office equipment that is found virtually on each desk in every business office is a card file that is used to hold names and addresses. These card files have a common design. Typically, there are a pair of parallel rails which extend upwardly from a base. The rails have a T-shaped cross section. Often the base if flat. In other instances, the base may be cylindrical, and the rails are disposed around the entire circumference of the cylinder. The cards which are placed in the card files are held in place by means of specially shaped cut-out portions. These cut-outs are designed to grip and hold onto the rails, thus restraining the cards in place.

It has been found that many office workers desire a mirror which is easily accessible during the business day. Such a mirror can be useful when preparing for meetings, presentations, and the like. Since card files are already present on most office desks, it has also been found that a mirror can be incorporated into such a card file and thus constantly kept available for immediate use.

SUMMARY OF THE INVENTION

The present invention provides a mirror that can be attached to a standard card file. The mirror is therefore constantly kept available for use. The mirror has a shape which is generally coincident with the cards that are used in standard card files. The mirror is substantially rectangular in shape, with rounded corners, and has two specially shaped cut out portions located in it bottom edge. The cut out portions are designed to attach the mirror to rails which are found in standard card files. In the preferred embodiment, the mirror is manufactured from a flexible plastic. The flexibility allows the mirror to be easily attached to and removed from the card file. The mirror is kept as thin as possible so as not to unnecessarily take up space in the card file.

BRIEF DESCRIPTION OF THE DRAWINGS

FIG. 4 is a second alternative embodiment of the present invention.

FIG. 5 is a third alternative embodiment of the present invention.

FIG. 6 is a fourth alternative embodiment of the present invention.

DETAILED DESCRIPTION OF THE INVENTION

An improved mirror for use with a standard card file is disclosed. Throughout the following description numerous details such as specific shapes and materials are set forth in order to provide a more thorough understanding of the present invention. In other instances, well known elements and manufacturing methods are not described in detail so as not to obscure the present invention unnecessarily. Moreover, throughout the following Specification the present invention is described with reference to the card file. It is to be understood that the card file is not an element of the present invention. Although the present invention is used in conjunction with the card file, the invention itself consists of the improved mirror, in any one of the embodiments described. The card file is included in the description solely to provide a more complete understanding of the operation and use of the present invention.

Figure 1A:
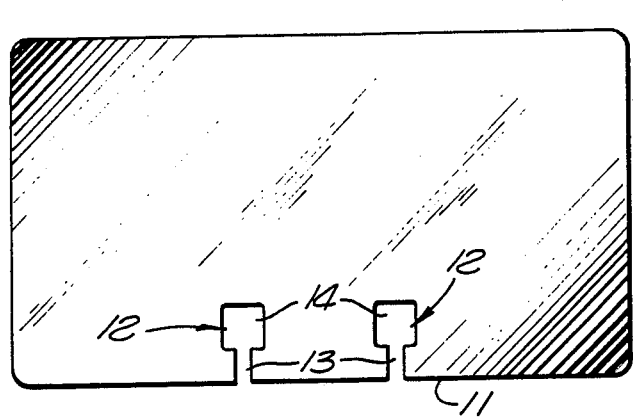
FIG. 1 is a plan view of the preferred embodiment of the present invention.
Figure 1B:
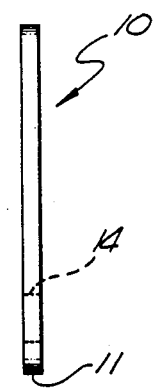

Referring first to FIG. 1a, a plan view of the preferred embodiment of the present invention is illustrated. As shown, the mirror 10 is substantially rectanguar in shape. This shape is chosen because it generally conforms to the shape of cards which are used in standard card files. The preferred embodiment at the mirror has rounded corners. The preferred embodiment of the mirror is designed to be as flat and thin as possible while still retaining sufficient rigidity. This is shown in FIG. 1b. The mirror is kept thin because it is desired to take up as little space as possible in the card file. Thus, the mirror is essentially a two-dimensional object. If the mirror was relatively thick, it would take up space in the card file that could otherwise be used for cards.

A means for connecting the mirror to the card file is provided. As shown in FIG. 1, the mirror 10 has two specially shaped cut out portions 12 located along its bottom edge 11. The cut out portions 12 are designed to attach the mirror 10 to the rails of the card file. The cut out portions 12 consist of a narrow section 13 which extends inwardly from the bottom edge 11 of the mirror and are connected to a larger opening 14.

Figure 2:
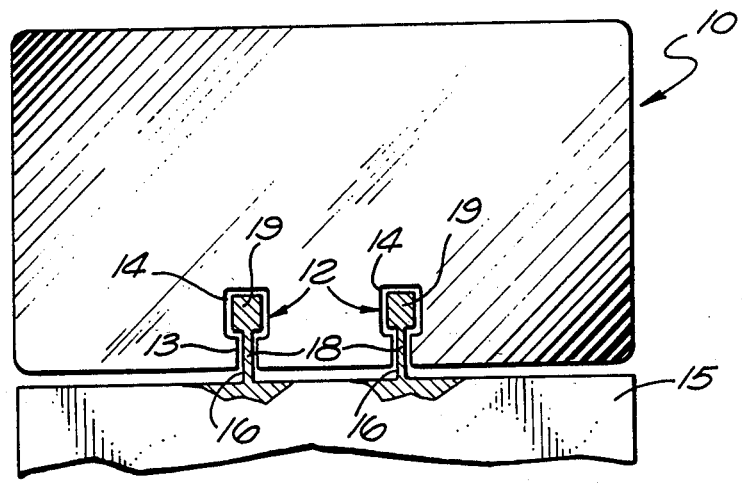
FIG. 2 illustrates how the present invention connects to a standard card file base.

FIG. 2 illustrates how the mirror connects to the base of the card file. In FIG. 2, a cross-sectional view of a card file is shown with the mirror 10 attached to it. The card file comprises a base 15 with a pair of upwardly extending rails 16. The mirror actually connects to the rails 16 and is separate from the base. The rails, as illustrated, have a generally T-shaped cross section with a vertical stem portion 18 and a horizontal top member 19. At other times the rails may have an L-shaped cross section, and the horizontal member does not extend inwardly of the vertical stem 18. The present invention can be just as easily used with either design. The rails are usually separated by a standard distance. Thus, the cut out portions 12 are similarly spaced apart by this same distance. In this manner, the mirror 10 will properly attach to the card file. The width between the cut out portions is not limited to any specific distance, however. In fact, card files often come in different sizes to allow for different size cards. It is anticipated that the present invention will also be manufactured in these varying sizes.

The size of the cut out portions is somewhat critical. They should be large enough to allow the mirror 10 to grip and hold onto the rails 16 without being released. However, the user of the card file should be able to easily move the mirror and surrounding cards in order to access neighboring cards. Thus, the cut out portions 12 should not grip the rails 16 too tightly. Therefore the size of openings 14 is chosen to be somewhat larger than the size of the horizontal member 19. This assures that there will be sufficient play between the mirror 10 and the rails 16 to allow for easy movement of the mirror. Of course, the width of the narrow portions 13 must be large enough to accommodate the horizontal members without binding.

As noted above, the mirror is designed to be relatively thin. In the preferred embodiment, the mirror is manufactured from a flexible plastic. The flexible plastic allows the mirror to be easily bent and attached to the card file. As shown in FIG. 2, the distance between the outer edges of the horizontal members 19 on the rails 16 is slightly larger than the distance between the outer edges of the narrow portions 13. Thus, the mirror 10 is made flexible so that it can be bent to allow for attachment to, and removal from the card.

In other instances, the mirror may be made from a more rigid material. In this case, the mirror is mounted onto the card file simply by pressing it down onto the rails 16. The rails then bend inwards, allowing the mirror 10 to snap into place. This attachment method works best when the rails have an L-shaped cross section.

Figure 3:
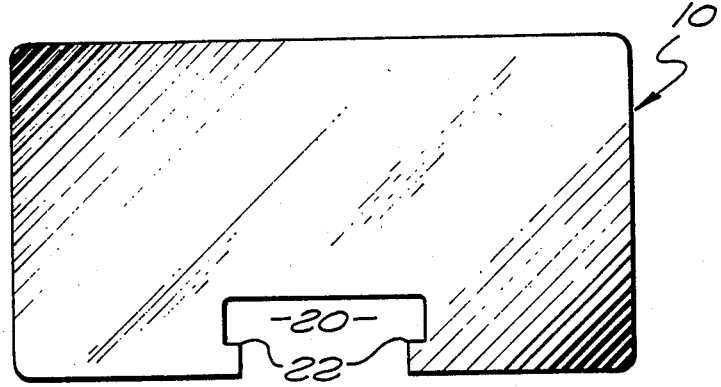
FIG. 3 is a plan view of an alternative embodiment of the present invention.

Referring next to FIGS. 3 through 6, several alternative embodiments of the present invention are shown. FIG. 3 illustrates a mirror which has only one cut out portion 20. As with the preferred embodiment, the cut out portion grips the rails 16 and holds the mirror in place. With this embodiment, the corners 22 of the cut-out portion overlap slightly with the horizontal member 19 of the rails for retention purposes. It is only necessary to have a very slight overlap in order to properly hold the mirror. If the overlap is too big, then the mirror cannot be easily removed and attached. The advantage of a single cut out portion is that it takes less material to manufacture, and is sometimes easier to attach to the rails of the card file.

The mirror shown in FIG. 4 has the same basic shape as the preferred embodiment. However, it is manufactured in a slightly different fashion. The mirror 30 is connected to a separate sheet of base material 31. This is best illustrated in FIG. 4a, which is a side view of the mirror. In this embodiment, the means for attaching the mirror to the card file is not incorporated directly into the reflective element itself. Instead, the cut out portions are incorporated into the base 31. The base can be manufactured from a lightweight, flexible material, such as cardboard or card stock. However, the base must have sufficient strength to adequately support the mirror.

The mirror shown in FIG. 5 has a construction similar to that shown in FIG. 4. Again, the mirror 40 is mounted on a sheet of base material 41. This is best shown in FIG. 5b. In this alternative embodiment, the mirror does not cover the entire card. Instead, a space 42 is left along the side edges of the mirror. Also, its base 43 is left along the top edge 44 of the card. Additionally, the top edge of the card may be extended upwards creating an additional surface 45 at the top edge of the card. This additional area 45 can be used as a place for locating textual material such as advertising. By leaving a space along the sides and top edges of the mirror, the manufacturing process is simplified. It is not necessary to closely align the edges of the mirror 40 with the edges of the base material 41.

Finally, in FIG. 6, yet another alternative embodiment of the present invention is shown. In this embodiment, the cut out portions 50 in the mirror can be simply circular holes. This embodiment has been found to be advantageous when the mirror 10 is intended to be permanently placed within a card file. With this embodiment, the mirror 10 is mounted on to the rails of the card file when the file is originally manufactured. With this embodiment, the mirror can not be removed from the card file without dismantling the card file. This embodiment can be used when it is desired to have a fixed arrangement of the cards within the file.

In the foregoing specification, the present invention has been described with reference to specific exemplary embodiments. It will be apparent to those skilled in the art, however, that various changes may be made to these embodiments without departing from the overall spirit and scope of the invention. Some of these variations have been described. Others are possible. The Specification and drawings are, therefore, to be regarded in an illustrative rather than restrictive sense. The full scope of the present invention is limited only by the following claims.

What is claimed is:

1. An improved mirror comprising:
   a substantially rectangular first portion, said first portion having a reflective surface top and bottom edges and first and second side edges;
   a second portion coupled to said bottom edge of said first portion, said second portion comprising a means for removably engaging said mirror with the rails of a card index file.

2. The mirror of claim 1 wherein said first and second portions are substantially flat and co-planar.

3. The mirror claim 1 wherein said second portion comprises a plurality of extensions integrally formed with said first portion and extending away from said first portion.

4. The mirror of claim 3 wherein said second portion comprises two substantially rectangular tabs extending downwardly from said first portion so as to define a single cut out portion, said cut out portion having a width substantially equal to the distance between the rails in a card index file.

5. The mirror of claim 4, wherein said second portion further comprises a third extension located centrally along said bottom edge and extending downwardly such that said first, second and third extensions define two cut out portions, wherein each of said cut out portions are narrow at the bottom and wider at the top, and said cut out portions are separated by a width substantially equal to the distance between the rails in a card index file.

6. The mirror of claim 1 wherein both said first and second portions are mirrored so as to provide a reflective surface.

7. The mirror of claim 1 wherein said first and second portions are manufactured from a flexible plastic such that said mirror may be easily attached to said card file.

* * * * *